(12) United States Patent
Jaillon

(10) Patent No.: US 8,469,641 B2
(45) Date of Patent: Jun. 25, 2013

(54) PROCESS FOR DRILLING A BORE AND CORRESPONDING TOOL

(75) Inventor: Jaques Henri Jaillon, Noisy le Sec (FR)

(73) Assignee: Cooper Power Tools SAS, Ozoir la Ferriere (FR)

( * ) Notice: Subject to any disclaimer, the term of this patent is extended or adjusted under 35 U.S.C. 154(b) by 1123 days.

(21) Appl. No.: 11/925,448

(22) Filed: Nov. 24, 2008

(65) Prior Publication Data

US 2009/0074525 A1    Mar. 19, 2009

(30) Foreign Application Priority Data

Oct. 27, 2006 (FR) ...................................... 06 09484

(51) Int. Cl.
*B23B 47/34* (2006.01)
(52) U.S. Cl.
USPC .............................. 408/17; 408/138; 408/132
(58) Field of Classification Search
USPC .............. 408/17, 138, 139, 141, 132; 173/48, 173/109, 105, 205
See application file for complete search history.

(56) References Cited

U.S. PATENT DOCUMENTS

| | | | | |
|---|---|---|---|---|
| 1,219,537 A | * | 3/1917 | Dalton | 408/9 |
| 2,453,136 A | | 11/1948 | Karweit et al. | |
| 2,458,929 A | * | 1/1949 | Clark | 408/17 |
| 2,514,758 A | * | 7/1950 | Hallden | 74/22 R |
| 2,515,539 A | * | 7/1950 | Wichman | 74/22 R |
| 2,869,402 A | * | 1/1959 | Bunnell | 74/22 R |
| 3,018,674 A | * | 1/1962 | Kohler | 74/22 R |
| 3,028,771 A | * | 4/1962 | Bunnell | 173/199 |
| 3,487,729 A | | 1/1970 | Juhasz et al. | |
| 3,574,290 A | | 4/1971 | Eckman | |
| 3,583,822 A | | 6/1971 | Alexander et al. | |
| 3,767,313 A | | 10/1973 | Bohoroquez et al. | |
| 3,797,583 A | | 3/1974 | Quackerbush | |
| 3,838,934 A | | 10/1974 | Petroff | |
| 4,083,646 A | | 4/1978 | Vindez | |
| 4,098,351 A | * | 7/1978 | Alessio | 173/13 |
| 4,111,590 A | | 9/1978 | Burkart et al. | |
| 4,443,139 A | | 4/1984 | Eash | |
| 4,534,683 A | * | 8/1985 | Colliau | 408/17 |
| 4,591,299 A | | 5/1986 | Eckman | |
| 4,592,681 A | | 6/1986 | Pennison et al. | |
| 4,612,998 A | | 9/1986 | Vindez | |
| 4,641,714 A | * | 2/1987 | Ferioli | 173/109 |
| 4,681,490 A | | 7/1987 | Pennison et al. | |
| 4,688,970 A | | 8/1987 | Eckman | |

(Continued)

FOREIGN PATENT DOCUMENTS

| | | |
|---|---|---|
| DE | 19 58 412 | 5/1971 |
| DE | 24 36 340 | 3/1975 |

(Continued)

*Primary Examiner* — Eric A Gates
*Assistant Examiner* — Paul M Janeski
(74) *Attorney, Agent, or Firm* — King & Spalding LLP

(57) ABSTRACT

In this process for drilling a bore (61), a drilling tool (11) is driven simultaneously in rotation about an axis (A) and in translation along the axis (A) in accordance with an advance movement. The advance movement is combined with an oscillating movement of the drilling tool (11) along the axis (A) of an amplitude sufficient to break up the swarf formed, while at the same time keeping the drilling tool (11) in the bore (61) which is in the process of being drilled. In certain exemplary embodiments, the application may be relevant to the aircraft construction industry.

11 Claims, 2 Drawing Sheets

U.S. PATENT DOCUMENTS

| | | | |
|---|---|---|---|
| 4,799,833 A | 1/1989 | Pennison et al. | |
| 4,822,215 A | 4/1989 | Alexander | |
| 4,850,753 A | 7/1989 | Dudden | |
| 4,854,786 A | 8/1989 | Alexander et al. | |
| 5,022,798 A | 6/1991 | Eckman | |
| 5,077,876 A * | 1/1992 | McConkey | 29/27 R |
| 5,143,161 A * | 9/1992 | Vindez | 173/19 |
| 5,149,232 A | 9/1992 | Eckman | |
| 5,351,797 A | 10/1994 | Lawson et al. | |
| 5,711,379 A * | 1/1998 | Amano et al. | 173/48 |
| 6,193,447 B1 | 2/2001 | Thames et al. | |
| 6,196,772 B1 | 3/2001 | Thames et al. | |
| 6,261,033 B1 | 7/2001 | Thames et al. | |
| 6,684,964 B2 * | 2/2004 | Ha | 173/29 |
| 6,910,836 B2 * | 6/2005 | Peterson | 408/9 |
| 7,350,592 B2 * | 4/2008 | Hahn et al. | 173/48 |
| 7,510,024 B2 * | 3/2009 | Veres | 173/216 |
| 2006/0018724 A1 | 1/2006 | Oehninger et al. | |
| 2008/0223592 A1 * | 9/2008 | Erhardt | 173/48 |
| 2008/0260485 A1 | 10/2008 | Jaillon | |
| 2009/0022555 A1 | 1/2009 | Oehninger et al. | |
| 2009/0074525 A1 | 3/2009 | Jaillon | |
| 2009/0245955 A1 | 10/2009 | Maillard | |

FOREIGN PATENT DOCUMENTS

| | | |
|---|---|---|
| DE | 37 42 725 | 7/1989 |
| EP | 1 500 780 | 1/2005 |
| FR | 2 829 952 | 3/2003 |

* cited by examiner

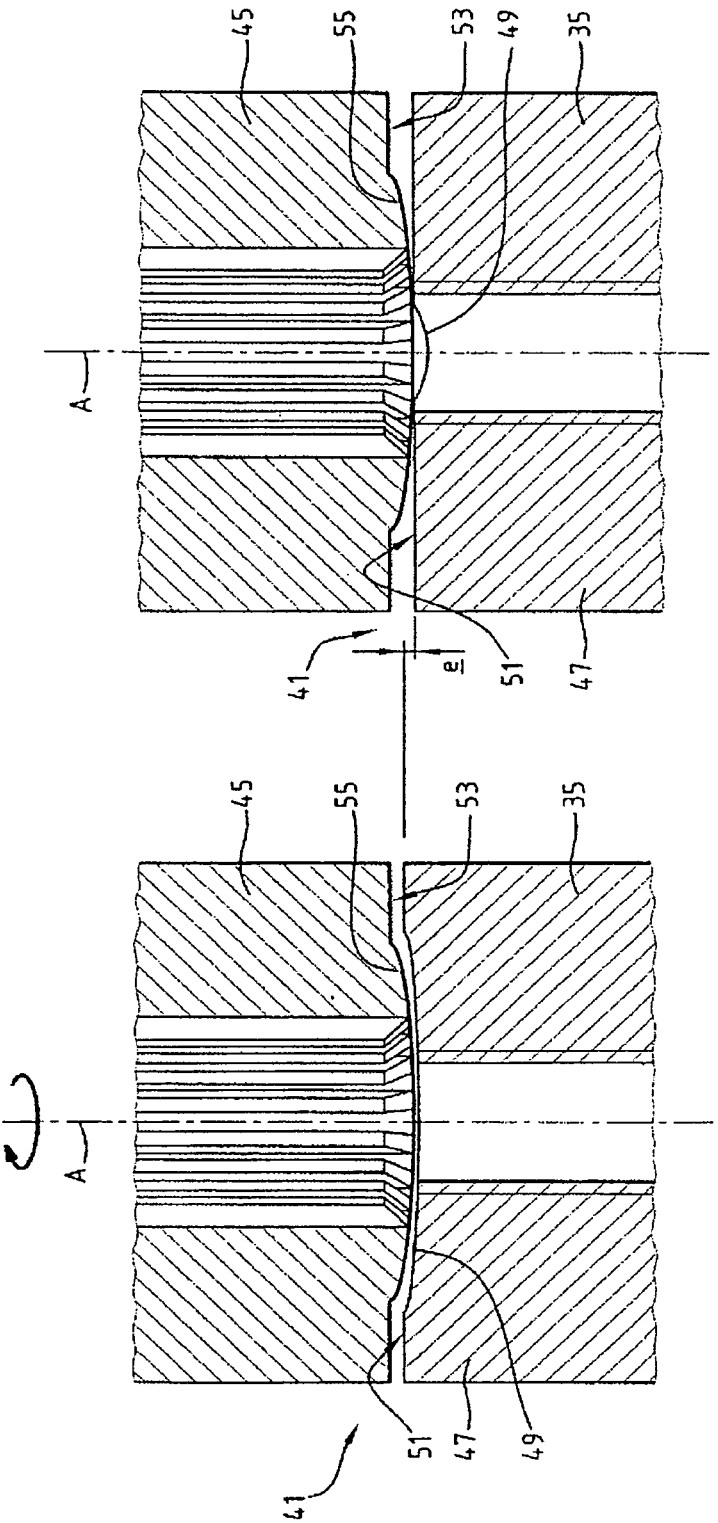

PROCESS FOR DRILLING A BORE AND CORRESPONDING TOOL

PRIORITY CLAIM TO RELATED APPLICATION

This application claims priority under 35 U.S.C. § 119 to French Patent Application No. 06/09484 filed on Oct. 27, 2006.

TECHNICAL FIELD

The present invention relates to a process for drilling a bore, in which process a drilling tool is driven simultaneously in rotation about an axis and in translation along the axis in accordance with an advance movement.

The invention is applicable, for example, to aircraft construction.

BACKGROUND TO THE INVENTION

In order to implement such a drilling process in this type of application, use is generally made of a machine tool comprising:
  a casing;
  a tool-holder spindle extending along an axis;
  a mechanism for driving the tool-holder spindle, the mechanism comprising:
    a first member for driving the spindle in rotation about its axis relative to the casing;
    a second member for driving the spindle in translation along its axis relative to the casing, the second member for driving in translation being screwed onto a threaded portion of the spindle so that the spindle advances or returns along the axis as a function of the relative rate of rotation of the drive members.

A tool of that type is known, for example, from U.S. Pat. No. 5,351,797. The drive mechanism of such a tool is referred to as "having positive feed" in English or "à avance mécanique" in French.

A single motor thus ensures, via the drive mechanism, that the spindle is driven in rotation about its axis and, at the same time, that it is advanced or returned by translation along its axis.

Since the translation and rotation drives of the spindle are connected mechanically, the advance of the spindle per revolution is constant. Thus, the variations in the speed of the motor have no effect on the rate of advance per revolution. The thickness of the swarf formed therefore remains constant and promotes the surface quality and the precision of the bores drilled by such a tool.

Although such a tool is found to be generally satisfactory, its use for drilling deep bores or materials renowned for being difficult, such as composite materials, may prove to be tricky.

For example, when a deep bore is drilled, the swarf accumulates in the flutes of the drill bit carried by the spindle until the motor of the tool is caused to stall. It is then necessary to proceed in several stages or to start fresh drilling cycles for the same bore to be drilled.

The drilling quality may also be degraded if the drill bit is repositioned incorrectly relative to the bore which has been started. The pressure of the swarf inside the bore also causes the deterioration of the surface thereof.

In order to solve that problem, French Patent No. 2,873,315 has proposed a tool provided with means for displacing the second member for driving in translation along the axis of the spindle between an advanced position and a returned position. Thus, in the course of drilling, the spindle is removed completely from the bore under the action of the displacement means in order to evacuate the swarf and to ensure that the bore is cleared. Although such a withdrawal of the spindle can be effected far more rapidly than by the conventional return movement of the spindle, it increases substantially the time necessary to drill a bore.

In addition, the performance of the clearing operation requires a control system in order to observe a predetermined clearing frequency or to meet a specific clearing requirement. Such a control system is relatively complex.

SUMMARY OF THE INVENTION

An object of the invention is therefore to solve those problems by providing a process which permits the drilling of deep bores or materials renowned for being difficult in a reduced time and which can be implemented by simpler tools.

To that end, the invention relates to a process for drilling a bore, in which process a drilling tool is driven simultaneously in rotation about an axis and in translation along the axis in accordance with an advance movement, wherein the advance movement is combined with an oscillating movement of the drilling tool along the axis of an amplitude sufficient to break up the swarf formed, while at the same time, keeping the drilling tool in the bore which is in the process of being drilled.

The invention relates also to a tool for drilling a bore for the implementation of a process such as defined above.

According to particular embodiments, the tool may have one or more of the following features, taken in isolation or in accordance with any technically possible combination:
  the tool comprises:
  a casing;
  a tool-holder spindle which extends along an axis and which is to carry a drilling tool;
  a mechanism for driving the tool-holder spindle, which mechanism is capable of driving the drilling tool simultaneously in rotation about an axis and in translation along the axis in accordance with an advance movement, and the drive mechanism is suitable for combining the advance movement of the spindle with an oscillating movement along the axis;
  the drive mechanism comprises:
  a first member for driving the spindle in rotation about its axis relative to the casing;
  a second member for driving the spindle in translation along its axis relative to the casing, the second drive member being screwed onto a threaded portion of the spindle, so that the spindle advances or returns along the axis as a function of the relative rate of rotation of the drive members;
  the oscillating movement has an amplitude greater than or equal to the advance of the spindle in the course of one revolution of the second drive member about the axis relative to the first drive member;
  the drive mechanism comprises a cam/cam follower unit for ensuring the oscillating movement of the spindle;
  the cam/cam follower unit comprises at least one element forming a cam and one element forming a cam follower, and a first of those elements is fixed for rotation with the spindle and the second of those elements is fixed for rotation with the second drive member; and
  the second element of the unit forming the cam/cam follower is formed by the second drive member.

BRIEF DESCRIPTION OF THE DRAWINGS

The invention will be better understood on reading the following description which is given purely by way of example and with reference to the appended drawings in which:

FIGS. 2 and 3 are partial diagrammatic views, in lateral and enlarged section, illustrating a different position of the cam/cam follower system of the drive mechanism of the tool of FIG. 1.

Figure 1:
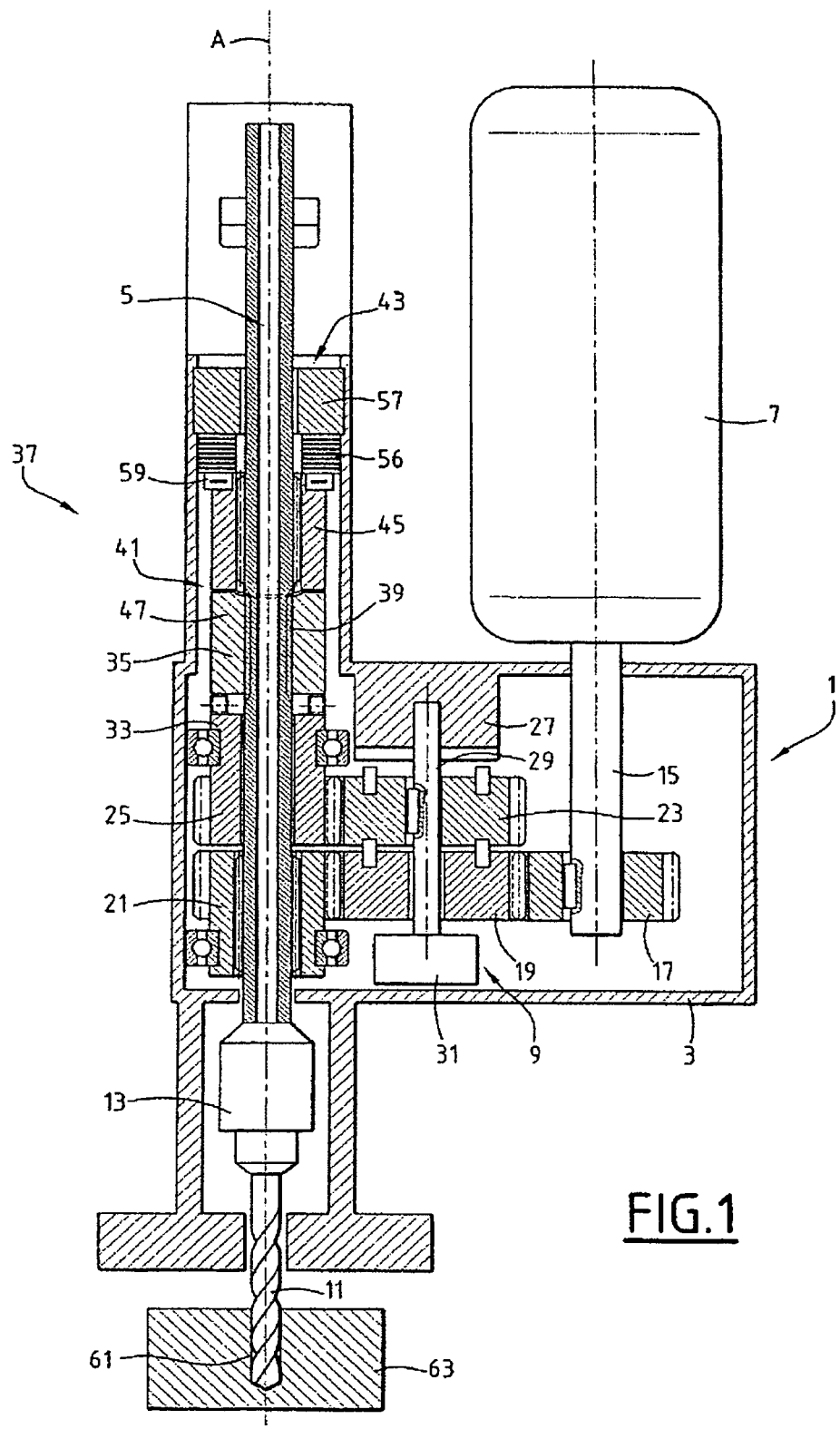
FIG. 1 is a diagrammatic view in lateral section of a tool for implementing a process according to the invention.

Throughout the following, the terms "right", "left", "vertical", "horizontal", "lower", "upper", "top" and "bottom" are to be understood in relation to the position of the tool in the Figures.

DESCRIPTION OF PREFERRED EMBODIMENTS

FIG. 1 illustrates diagrammatically a portable machine tool 1 which comprises principally: a casing 3; a tool-holder spindle 5 extending along a vertical axis A; a motor 7, for example a pneumatic motor; and a mechanism 9 which drives the spindle 5 and which connects the motor 7 and the spindle 5 mechanically. The spindle 5 is received in the casing 3 in such a manner that it is mobile in rotation about its axis A and in translation along that axis A.

In order to be able to drill bores, a drilling tool 11, in the form of a drill bit, is mounted in a removable manner at the lower end 13 of the spindle 5. The output shaft 15 of the motor 7 carries an output gear wheel 17 which meshes with the drive mechanism 9. In the example shown, the motor 7 is disposed parallel with the spindle 5. However, it could be disposed substantially at right-angles relative to the latter, as explained, for example, in French Patent No. 2,829,952, the contents of which are incorporated herein by reference. As illustrated by FIG. 1, the drive mechanism 9 comprises the following elements, so that it constitutes a mechanism referred to as "having positive feed" in English or as "à avance mécanique" in French: a first gear wheel/positive clutch 19 meshing with the output gear wheel 17; a first gear wheel 21 meshing with the first gear wheel/positive clutch 19; a second gear wheel/positive clutch 23 surmounting the first gear wheel/positive clutch 19; a second gear wheel 25 which surmounts the first gear wheel 21, and a fixed positive clutch 27 which surmounts the second gear wheel/positive clutch 23 and which is, for example, fixedly joined to the casing 3.

The first gear wheel 21 is slipped onto the spindle 5 and is fixed for rotation with the latter. The spindle 5 is mobile in translation relative to the gear wheel 21 along the axis A. This connection between the spindle 5 and the first gear wheel 21 is, for example, obtained by means of splines.

In a conventional manner, the second gear wheel/positive clutch 23 is carried by a slide 29 in order to be mobile under the action of a piston 31 between a lowered position (FIG. 1), in which the second gear wheel/positive clutch 23 is form-fitted to the first gear wheel/positive clutch 19 and is therefore fixed for rotation with the latter, and a raised position in which the second gear wheel/positive clutch 23 is form-fitted to the fixed positive clutch 27 and is therefore fixed in rotation relative to the casing 3.

In a conventional manner, the numbers of teeth of the gear wheels/positive clutches 19 and 23 and of the gear wheels 21 and 25 are adapted in such a manner that, when the two gear wheels/positive clutches 19 and 23 are form-fitted to each other, the gear wheel 25 rotates at a slightly higher rate than that of the gear wheel 21 in order to drive the spindle 5 in translation towards the bottom, in an advance movement, as will be described hereinafter.

Unlike conventional positive-feed mechanisms, the second gear wheel 25, in the example described, is free to rotate relative to the spindle 5 and is therefore not screwed onto a threaded portion of the latter.

The second gear wheel 25 is extended towards the top by a rotary positive clutch 33 which is, for example, integral with the second gear wheel 25. By way of variation, the positive clutch 33 can be secured to the latter.

The positive clutch 33 is therefore fixed for rotation with the second gear wheel 25 and can rotate freely relative to the spindle 5 about its axis A.

The drive mechanism 9 also comprises, as can be seen more clearly in FIG. 2, a dog/positive clutch 35, which surmounts the positive clutch 33, and a system 37 for displacing the dog/positive clutch 35 relative to the casing 3.

The dog/positive clutch 35 is screwed onto a threaded portion 39 of the spindle 5. The front or lower face of the dog/positive clutch 35 comprises coupling teeth enabling it to be form-fitted to the positive clutch 33. The height of those teeth and of those of the positive clutch 33 are such that they enable the form-fit to be maintained when the dog/positive clutch 35 is displaced axially between its advanced position and its returned position described hereinafter, it being observed that the gear wheels 21 and 25 are fixed axially relative to the casing 3.

The displacement system 37 comprises a cam/cam follower unit 41 and a mechanism 43 for the axial bearing of the unit 41 on the dog/positive clutch 35.

In the example shown, the unit 41 comprises a cam 45 and a cam follower 47. The cam follower 47 is formed by the rear or upper end of the dog/positive clutch 35. To be more precise, and as illustrated by FIG. 2, a relief 49 in the form of a recess is formed in the rear face 51 of the dog/positive clutch 35. That recess 49 has, for example, an elongate shape extending at right-angles, along a diameter of the dog/positive clutch 35, to the axis A.

The cam 45 is slipped onto the spindle 5 behind the dog/positive clutch 35. The front or lower face 53 of the cam 45 is provided with a cam ramp 55 which, in the example shown, is a projection which has a shape substantially complementing that of the recess 49. This can be seen in FIG. 2, where the reliefs 49 and 55 have the same angular orientation relative to the axis A. In FIG. 3, those reliefs 49 and 55 have orientations arranged at 90° to each other.

The cam 45 is fixed for rotation with the spindle 5. This fixing is effected, for example, by means of splines.

The mechanism 43 for axial bearing comprises, for example, damping means 56, especially in the form of a thrust spring. Those resilient means 56 bear, at the rear, on a wall 57 of the casing 3 and, at the front, by way of a roller bearing 59, on the rear end of the cam 45. The roller bearing 59 enables the friction between the damping means 56, which are fixed in rotation about the axis A, and the cam 45, which is driven in rotation about the axis A by the spindle 5, to be limited.

The mechanism 43 which is fixedly joined to the casing 3 restrains the resulting thrust of the tool 11 by holding the front face 53 of the cam 45 against the rear face 51 of the dog/positive clutch 35 and therefore it restrains the dog/positive clutch 35. The spindle 5, which is fixed for translation with the dog/positive clutch 35 owing to the helical connection between the dog/positive clutch 35 and the spindle 5, is therefore held towards the front against the thrust of the spindle 5.

It will be appreciated that the rate of relative rotation between the dog/positive clutch 35 and the cam 45 is the same as that between the gear wheels 21 and 25.

The dog/positive clutch 35 is mobile axially relative to the casing 3 between an advanced position and a returned position.

The returned position is illustrated by FIG. 2. In that position, the projection 55 and the recess 49 have the same angular orientation relative to the axis A and are therefore engaged one inside the other. The stack formed by the dog/positive clutch 35 and the cam 45 therefore has a lower height, as viewed along the axis A.

In the advanced position, illustrated by FIG. 3, the reliefs 49 and 55 are arranged angularly at 90° to each other. The projection 55 is therefore not engaged in the recess 49 so that the stack formed by the dog/positive clutch 35 and the cam 45 has a height which is greater by e than that which it has in the returned position of the dog/positive clutch 35.

The operation of the tool will now be described.

If the second gear wheel/positive clutch 23 is in the lowered position and if the motor 7 is supplied with pressurized air, the second gear wheel 25 and the dog/positive clutch 35 rotate about the axis A at a rate slightly higher than that of the first gear wheel 21. The drive mechanism 9 therefore ensures: the driving in rotation of the spindle 5 via the gear wheel/positive clutch 19 and the first gear wheel 21; and, at the same time, the advance of the spindle 5, that is to say, its displacement in translation towards the bottom along the axis A, this advance being due to the helical connection between the spindle 5 and the dog/positive clutch 35 and to the difference in the rates of rotation between the dog/positive clutch 35 and the gear wheel 21 and therefore the spindle 5.

If the spindle 5 is driven in rotation in the clockwise direction, the thread of the helical connection between the spindle 5 and the dog/positive clutch 35 is left-handed in order to ensure the described advance movement.

As indicated above, the dog/positive clutch 35 and the cam 45 will rotate relative to each other about the axis A at a relative rate equal to that existing between the gear wheels 21 and 25. Owing to that relative rotation, the dog/positive clutch 35 will pass alternately from its advanced position to its returned position.

The general advance movement of the spindle 5 described above, which is produced owing to the positive-feed mechanism 9, is therefore combined with an oscillating translation movement of the spindle 5 along the axis A. That oscillating movement has an amplitude of travel substantially equal to e.

The first drive mode described above enables a bore 61 to be drilled in a workpiece 63 by means of the drill bit 11 carried by the spindle 5. The oscillation amplitude of the spindle 5 is relatively low so that the spindle 5 remains inside the bore 61 in the course of the drilling operation.

Typically, the oscillation amplitude is substantially equal to the advance of the spindle 5, that is to say, to the advance of the latter along the axis A in the course of one revolution of the gear wheel 25 relative to the gear wheel 21.

The tool 1 also offers a second drive mode, which is described below.

If the second gear wheel/positive clutch 23 passes into its raised position, the drive mechanism 9 ensures: the driving in rotation of the spindle 5 via the first gear wheel/positive clutch 19 and the first gear wheel 21 and, at the same time; the return of the spindle 5, that is to say, its displacement in translation towards the top along the axis A, the second gear wheel/positive clutch 23, the second gear wheel 25, the positive clutch 33 and the dog/positive clutch 35 then being fixed in position, the rotation of the spindle 5 about its axis A ensuring the return movement owing to the helical connection between the dog/positive clutch 35 and the spindle 5 owing to the left-handed thread.

This second drive mode enables the spindle 5 to be returned when the drilling of the bore has been completed.

As indicated above, during the drilling operation, the spindle 5 will perform a general translation movement towards the front combined with an oscillating translation movement of lesser amplitude. At each return of the spindle 5, this oscillating movement will bring about the breaking up of the swarf formed. This fractionation of the swarf formed will facilitate, on the one hand, its evacuation and, on the other hand, the production of a bore 61 of very great precision with a high-quality surface state, even in the case of very great depths.

In addition, the oscillating movement of the spindle 5 is obtained owing to the cam/cam follower unit 41 and therefore, does not require the use of a pneumatic or electronic control system. The tool 1 is therefore simple.

Therein, the time taken to drill such a bore is reduced, since it is not necessary to withdraw the spindle 5 completely from the bore 61 in the process of being formed.

It will also be appreciated that the oscillation frequency of the spindle 5 is proportional to the relative speed between the dog/positive clutch 35 and the cam 45. This oscillation frequency is therefore reduced, which limits undesirable vibration and noise pollution.

It will be further appreciated that the profiles of the reliefs 49 and 55 do not have sharp edges, so as to avoid shock and impact. The absence of shock enables the tip and the cuffing edges of the drill bit 11 to be preserved intact.

More generally, the oscillating travel of the spindle 5 may be greater than a fraction of the advance of the spindle 5 but is kept sufficiently low so as not to affect the drilling operation. It is, in particular, such that the drill bit 11 remains in the bore 61 for most of the drilling operation. It is preferably of the order of magnitude of the advance of the spindle 5 and, for example, less than three times the advance of the spindle 5.

Likewise, other types of cam/cam follower units 41 may be used. These may comprise, for example, several cam followers. They may also comprise ramp surfaces provided on the opposing faces 51 and 53 of the dog/positive clutch 35 and the cam 45 with balls interposed between those two faces.

In addition, the driving in rotation of the elements of the cam/cam follower unit 41 may be different from that described above. Thus, the second gear wheel 25 may be screwed onto the spindle 5 and subjected directly to an oscillating movement without it being necessary to provide a dog/positive clutch 35.

It will also be noted that the oscillating movement of the spindle 5 may be obtained by means other than a cam/cam follower unit 41.

The linking of the first drive mode, that is to say, the driving in rotation and, simultaneously, the advance of the spindle 5, and the second drive mode, that is to say, the driving in rotation and, simultaneously, the return of the spindle 5, then the stoppage of the supply to the motor 7, can be controlled in a classical manner, for example, automatically by the pneumatic circuit for supplying the motor 7, after operating the button for starting the tool 1.

More generally, the displacement of the first member 21 for driving the spindle 5 in rotation and the displacement of the second member 35 for driving the spindle 5 in translation can be effected by two separate motors which control each other, for example, electronically.

I claim:

1. A tool for drilling a bore, wherein the tool comprises:
a casing;
a tool-holder spindle which extends along an axis and which is to carry a drilling tool; and
a drive mechanism for driving the tool-holder spindle, wherein the drive mechanism is capable of driving the drilling tool simultaneously in rotation about an axis and in translation along the axis in accordance with an advance movement, the drive mechanism being suitable for combining the advance movement of the spindle with an oscillating movement along the axis of an amplitude sufficient to break up swarf formed, while at the same time keeping the drilling tool in the bore which is in the process of being drilled, the drive mechanism comprising:
a first drive member for driving the spindle in rotation about its axis relative to the casing;
a second drive member for driving the spindle in translation along its axis relative to the casing, the second drive member being screwed onto a threaded portion of the spindle, so that the spindle advances or returns along the axis as a function of a relative rate of rotation of the first drive member and the second drive member, wherein the second drive member is movably coupled to a clutch at a first end of the second drive member; and
a cam/cam follower unit for ensuring the oscillating movement of the spindle, the cam/cam follower unit comprising a cam and a cam follower, the cam being fixed for rotation with the spindle, and the cam follower being fixed for rotation with the second drive member, wherein the second drive member includes the cam follower at a second end of the second drive member and wherein the cam is distinct from the second drive member and positioned adjacent to the cam follower.

2. The tool according to claim 1, wherein a relief in a form of a recess is formed in a surface of the second drive member.

3. The tool according to claim 1, wherein the oscillating movement has an amplitude greater than or equal to the advance of the spindle in the course of one revolution of the second drive member about the axis relative to the first drive member.

4. The tool according to claim 1, wherein the second drive member is axially mobile relative to the casing between an advanced position and a returned position.

5. The tool according to claim 1, wherein the drive mechanism comprises a mechanism for an axial bearing of the cam/cam follower unit on the second member.

6. The tool according to claim 5, wherein the axial bearing mechanism comprises resilient means bearing at the rear on the casing and at the front on the cam.

7. The tool according to claim 6, wherein resilient means is a thrust spring.

8. The tool according to claim 6, further comprising a roller bearing positioned between the cam and the resilient means.

9. The tool according to claim 5, wherein:
the axial bearing mechanism comprises resilient means bearing at the rear on the casing and at the front on the cam;
the first drive member is a first gear wheel slipped onto the spindle and fixed for rotation with the spindle;
the drive mechanism comprises a mechanism for an axial bearing of the cam/cam follower unit on the second member and a second gear wheel surmounting the first gear wheel, wherein the second gear wheel is free in rotation relative to the spindle,
the second gear wheel is extended by a rotary positive clutch fixed for rotation with the second gear wheel,
the second drive member is a dog/positive clutch comprising coupling teeth, the coupling teeth enabling the second drive member to be form-fitted to the rotary positive clutch, wherein the height of the coupling teeth and of those of the rotary positive clutch enable the form-fit to be maintained when the dog/positive clutch is displace axially between its advanced position and its returned position.

10. The tool according to claim 1, further comprising a gap between a portion of a surface of the cam and a portion of a surface of the cam follower.

11. The tool according to claim 1, wherein the second drive member is coupled to the clutch when the second drive member is in a raised position relative to the clutch and wherein the second drive member is coupled to the clutch when the second drive member is in a lowered position relative to the clutch.

* * * * *